(12) United States Patent
Suzuki et al.

(10) Patent No.: US 8,719,697 B2
(45) Date of Patent: May 6, 2014

(54) OBJECT CONTROL METHOD FOR DISPLAYING OBJECTS IN FRONT OF LINK ELEMENTS

(75) Inventors: Hisashi Suzuki, Tokyo (JP); Soh Masuko, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/504,827

(22) PCT Filed: Oct. 22, 2010

(86) PCT No.: PCT/JP2010/068740
§ 371 (c)(1),
(2), (4) Date: Jul. 10, 2012

(87) PCT Pub. No.: WO2011/052513
PCT Pub. Date: May 5, 2011

(65) Prior Publication Data
US 2012/0272130 A1    Oct. 25, 2012

(30) Foreign Application Priority Data

Oct. 29, 2009   (JP) .............................. P2009-249238

(51) Int. Cl.
*G06N 3/00*   (2006.01)
(52) U.S. Cl.
USPC ............................ 715/240; 715/205; 715/234
(58) Field of Classification Search
USPC .................................. 715/200, 205, 234, 240
See application file for complete search history.

(56) References Cited

U.S. PATENT DOCUMENTS

| 5,361,141 | A  | * | 11/1994 | Aoyama ........................ 358/452 |
| 5,754,713 | A  | * | 5/1998  | Deguchi et al. ............... 382/313 |
| 6,108,459 | A  | * | 8/2000  | Tsuji et al. .................... 382/300 |
| 7,164,504 | B1 | * | 1/2007  | Yamazaki ..................... 358/3.08 |
| 7,234,107 | B1 | * | 6/2007  | Aoki et al. .................... 715/207 |
| 7,725,530 | B2 | * | 5/2010  | Sah et al. ...................... 709/203 |
| 7,730,109 | B2 | * | 6/2010  | Rohrs et al. ................... 707/803 |

(Continued)

FOREIGN PATENT DOCUMENTS

| JP | 06-098149 A   | 4/1994 |
| JP | 2000-222324 A | 8/2000 |

(Continued)

OTHER PUBLICATIONS

International Preliminary Report on Patentability dated Jun. 21, 2012 for counterpart application PCT/JP2010/068740.

*Primary Examiner* — Stephen Hong
*Assistant Examiner* — Gregory J Vaughn
(74) *Attorney, Agent, or Firm* — Sughrue Mion, PLLC

(57) ABSTRACT

The system for the object control method according to an embodiment is a client/server system with a Web server (10) and a user terminal (20) connected through Internet (30). In the system for the object control method, a script (object control program) is embedded in a Web page to be transmitted from the Web server (10) and executed by the user terminal (20). The Web page contains a plurality of link elements (elements with links to other Web pages). A computer terminal having read the object control program displays a plurality of icons superimposed in front of the link elements in the Web page. Further, when a specified event is detected, (a) change the placement position of a specific icon, (b) temporarily or completely remove a specific icon, or (c) change the placement positions of a plurality of specific icons, for example, according to the event type.

16 Claims, 12 Drawing Sheets

(56) References Cited

U.S. PATENT DOCUMENTS 8,001,274 B2 * 8/2011 Srinivasan et al. ............ 709/246
8,078,694 B2 * 12/2011 Barton et al. ................. 709/219
2005/0102177 A1 * 5/2005 Takayama ....................... 705/14

FOREIGN PATENT DOCUMENTS

| JP | 2004-177936 A | 6/2004 |
| JP | 2008-250578 A | 10/2008 |
| JP | 2009-129119 A | 6/2009 |

* cited by examiner

OBJECT CONTROL METHOD FOR DISPLAYING OBJECTS IN FRONT OF LINK ELEMENTS

CROSS REFERENCE TO RELATED APPLICATIONS

This application is a National Stage of International Application No. PCT/JP2010/068740 filed Oct. 22, 2010, claiming priority based on Japanese Patent Application No. 2009-249238, filed Oct. 29, 2009, the contents of all of which are incorporated herein by reference in their entirety.

TECHNICAL FIELD

The present invention relates to a framework for displaying objects in front of an element to which a link is provided on a Web page and, particularly, to a process of controlling the objects in response to user operation.

BACKGROUND ART

<Related Art 1> A framework for moving a given image from a specific starting point to a specific arrival point on a map displayed on a screen of a user terminal is known (for example, see Patent Literature 1). Specifically, a line segment with the starting point and the arrival point at both ends is divided into a specified number (for example, 100) of segments, and a process of displaying the image at pixel coordinates $(Y_n, X_n)$ in an image display area corresponding to a position (latitude, longitude) at the n-th (for example, $0 \leq n \leq 100$) point from the starting point is repeated (see S34 to S44 of [FIG. 19-2] and paragraphs [0115] to in the Literature).

CITATION LIST

Patent Literature

PTL 1: Japanese Unexamined Patent Application Publication No. 2009-129119

SUMMARY OF INVENTION

Technical Problem

On a Web page, elements (for example, image, text, button and the like) to which links to other Web pages are provided are often placed. By providing links, arbitrary Web pages can be directly connected to each other. Further, by adding some motion to the elements with links, it is possible to attract user's attention to some extent.

On the other hand, the behavior, operation and the like of other users are basically not reflected in real time in a Web page due to the nature of HTTP that is used for transfer of Web pages. Therefore, the elements with links are typically clickable at all times. Thus, there has been no populated atmosphere generally in existing Web pages, though each element is in motion.

An object of the present invention is to provide an object control method that can create a populated atmosphere in a Web page. Another object of the present invention is to provide an object control method that displays objects to interfere with clicking superimposed on the front of elements with links. Yet another object of the present invention is to provide an object control method that displaces an object upon detection of user operation on the object.

Solution to Problem

To solve the above problem, according to the present invention, there is provided an object control method for a Web page containing a link element with a link provided to another Web page to display a plurality of icons in association with the link element, the method causing a computer terminal for displaying the Web page containing the link element to execute a placement position setting step of setting, for each of the icons, a placement position of the icon within a content region of the link element, an icon display step of displaying the icon in front of the link element at the set placement position to interference with clicking on the link element, and an icon displacement step of displacing one or a plurality of icons when user operation on the icon is detected.

Each of the icons may be an image having a certain region, and the plurality of icons may be displayed superimposed on a whole area in front of the link element to interfere with clicking on the link element by the plurality of icons. The image of each of the icons may be made up of an opaque region and a transparent region, and the content region of the link element may be visible through the transparent region of the image displayed superimposed in front of the link element.

The icon displacement step may include a process of, when drag-and-drop on any of the icons is detected, displacing the icon to a drop position. The icon displacement step may include a process of, when a pointer is placed over any of the icons, displacing the icon with a specified probability. The method may further cause the computer terminal to execute an icon re-displacement step of displacing each of the displaced icons to a placement position before change or its vicinity.

The method may further cause the computer terminal to execute an icon removal step of, when click or double-click on any of the icons is detected, removing the icon. The icon removal step may include a process of counting number of clicks on each of the icons and displaying the removed icon again after a lapse of a specified period of time when the counted number of clicks does not reach a specified number. The icon removal step may be a step of counting number of clicks on each of the icons and removing the icon when the counted number of clicks reaches a specified number.

Further, to solve the above problem, according to the present invention, there is provided an object control program for a Web page containing a link element with a link provided to another Web page to display a plurality of icons in association with the link element, the program causing a computer terminal for displaying the Web page containing the link element to execute a placement position setting step of setting, for each of the icons, a placement position of the icon within a content region of the link element, an icon display step of displaying the icon in front of the link element at the set placement position to interference with clicking on the link element, and an icon displacement step of displacing one or a plurality of icons when user operation on the icon is detected.

Furthermore, to solve the above problem, according to the present invention, there is provided a Web server connectable with a user terminal, including a Web data storage means for storing Web data at least including data of a Web page containing a link element with a link provided to another Web page and the object control program according to claim 10 embedded in the Web page, and a Web data transmitting means for transmitting the Web data to the user terminal in response to a request from the user terminal.

Advantageous Effects of Invention

The object control method according to the present invention displays, in a Web page containing a link element with a link provided to another Web page, a plurality of icons to interference with clicking on the link element are displayed in front of the link element. Further, a computer terminal into which an object control program according to the present invention is read displaces or removes the icons displayed in front of the link element when user operation on the icon is detected in the Web page.

In the present invention, the link elements are tangible representations of a shopping street or shopping mall, and the icons are tangible representations of users coming to the shopping street or shopping mall. By displaying a plurality of icons superimposed on the front of a specific link element, the situation where "crowded gathering" is formed at a specific product or shop is represented on the Web page. Further, by controlling icons in response to user operation (for example, moving of a pointer, clicking and the like), the situation where a user enters the "crowded gathering" is brought into mind. As a result, it is possible to create a populated atmosphere in the Web page. Because of the icons that interfere with clicking, accesses to the link element are limited and thereby the effect of swaying the buying inclination of users can be expected. On the other hand, because accesses to some link elements among a plurality of link elements are limited and thereby accesses can be distributed to the residual link elements, it is possible to reduce the load on a server that processes some link elements and equalize the load on the servers as a whole.

DESCRIPTION OF EMBODIMENTS

<Definition>
Element . . . Generic term for text, image, figure, button and the like that are displayed in a Web page.

Link element . . . Element to which a link to another Web page is provided.

Icon . . . Display of various data or processing function as picture or pictograph on a display screen. In the following description, image to which a link to another Web page is not provided. Note that the icon (image) is placed in front of a link element to interfere with clicking on the link element.

Content Region . . . Area where an element is displayed in a Web page. In the case of text with a link, area surrounded by a dotted line or the like when selected. In the case of image, figure, button or the like, area inside the frame of the image, figure, button or the like.

Displacement . . . To move a specific element from a first point to a second point. For example, the following aspects are included.

(a) Assume a plurality of points on a line (line segment, curved line) connecting the first point and the second point and repeat display and removal of the element at each point sequentially at high speed.

(b) Slide the element currently displayed at the first point to the second point.

(c) Remove the element currently displayed at the first point and display the element at the second point.

<Embodiment>
[1. System Configuration]

Figure 1:
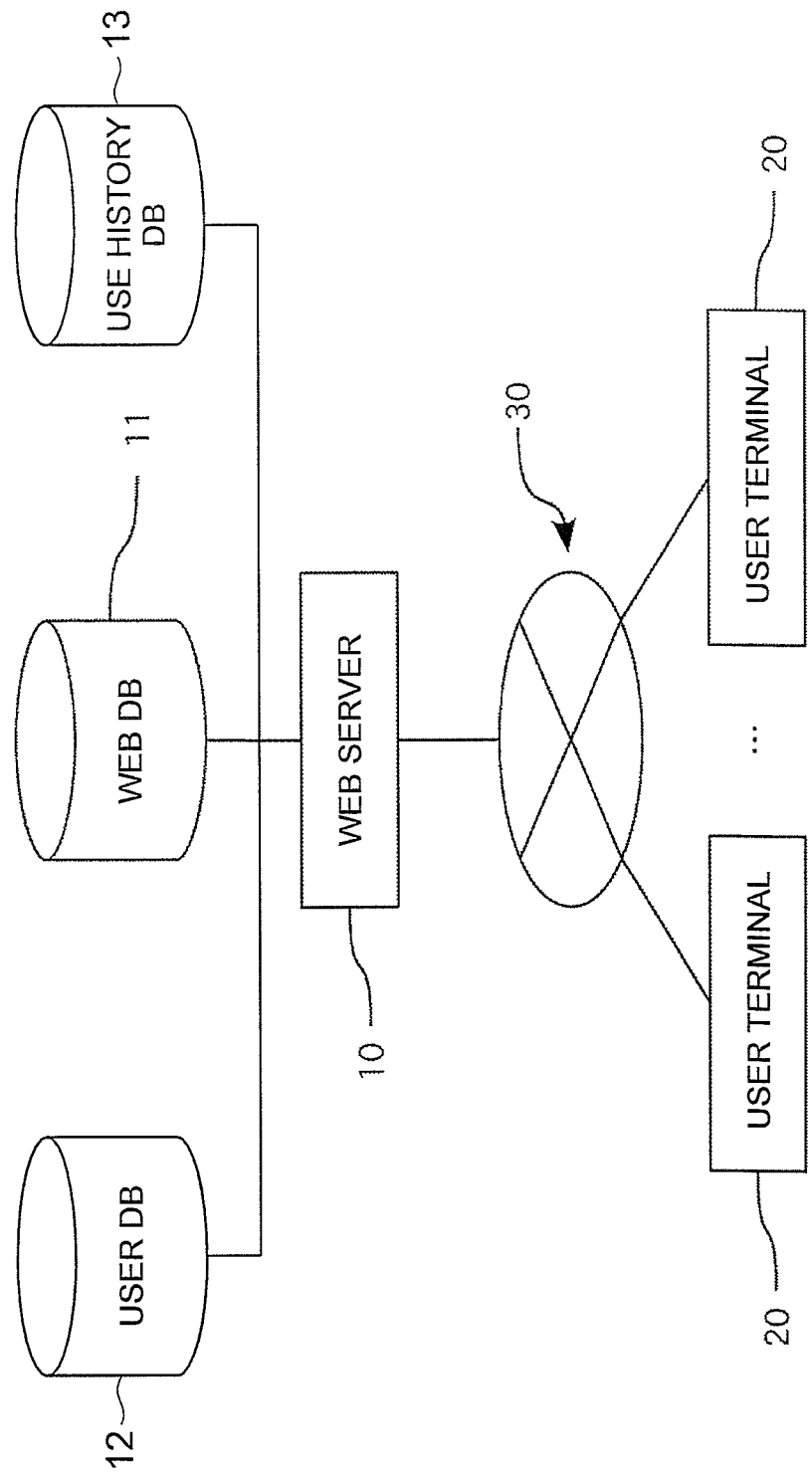
FIG. 1 is a block diagram showing a system configuration (embodiment).

FIG. 1 shows a configuration of a system for an object control method according to this embodiment. As shown in FIG. 1, the system for the object control method according to the embodiment is a client/server system in which a Web server 10 and a user terminal 20 are connected through a communication network (which is Internet 30 in the system for the object control method according to the embodiment).

The Web server 10 includes a Web DB 11 that stores various data (HTML and image referred to by the HTML, style sheet, script and the like, which are hereinafter referred to collectively as "Web data") which constitute a Web page, and transmits designated Web data to the user terminal 20 in response to a request from the user terminal 20.

Further, the Web server 10 includes a user DB 12 that stores user registration information (address, name, age, gender and email address, which are hereinafter referred to collectively as "user attribute"). The user DB 12 provides attribute information for creating a Web page to the Web server 10. Furthermore, the Web server 10 includes a use history DB 13 that stores the past use history (the page views, the click-through rate, the order quantity for each date, day of week or time) of each Web page. The use history DB 13 provides history information for creating a Web page to the Web server 10.

The user terminal 20 has a Web browser, reads the Web data received from the Web server 10 and displays the data on a display. It is assumed that the Web browser is capable of interpretation and execution of a script (for example, a program written in JavaScript (registered trademark)), and settings for interpretation and execution are ON. The user terminal 20 may be an existing information processing terminal having communication functions (for example, an electronic computer such as a personal computer).

[2. Object Control Program]

[(a) Feature]

In the system for the object control method according to the embodiment, a script (object control program) is embedded in a Web page to be transmitted from the Web server 10, and executed by the user terminal 20. It is assumed that a plurality of link elements (elements to which links to other Web pages are provided) are placed in the Web page. The computer terminal into which the object control program is read displays a plurality of icons superimposed on the front of the link elements in the Web page. Further, when a specified event is detected, the icons are controlled as follows, for example, according to the type of the event.

(a) Change the placement position of a specific icon.

(b) Temporarily or completely remove a specific icon.

(c) Change the placement positions of a plurality of specific icons.

In a Web page, the link elements are tangible representations of a shopping street or shopping mall, and the icons are tangible representations of users coming to the shopping street or shopping mall. By displaying a plurality of icons superimposed on the front of a specific link element, the situation where "crowded gathering" is formed at a specific product or shop is represented on the Web page. Further, by controlling icons in response to user operation (for example, moving of a pointer, clicking and the like), the situation where a user enters the "crowded gathering" is brought into mind. As a result, it is possible to create a populated atmosphere in the Web page.

To be specific, at least one element is set among a plurality of elements in a Web page firstly. At least one element may be set among the plurality of elements on the basis of the current or past various access data and statistical data (for example, the page views (PV), the click-through rate (CTR), the order quantity and the like). Further, at least one element may be set among the plurality of elements by recognizing elements desired to be accessed and elements not desired to be accessed according to the current server load. For setting of the element, the current access data, the past data during a certain time period which was a certain period ago, or the current server load may be used. In any case, a threshold may be set so that the element can be set on the basis of the threshold.

Next, the number of icons is set. The number of icons is preferably two or more. In the case of setting a plurality of icons, the number of icons may be decided according to the current or past access data or the current server load. In the case of using the access data, the shape of the icon may be varied depending on user attributes (attributes such as gender, age and district) by referring to the use history.

Then, a target position is set within the content region of the set target element for each of the icons. The target position is set from the target elements. When all elements are the target elements, those elements serve as candidates for the target position. However, not all candidates are set as the target position in some cases. By setting the target position within the content region, setting the icons on the element, and displaying the icons that have converged superimposed on the element, it is possible to represent the degree of attracting attention of a product or the like related to the element.

Because of the icons that interfere with clicking, accesses to the link element are limited and thereby the effect of swaying the buying inclination of users can be expected, and further accesses to some link elements among a plurality of link elements are limited and thereby accesses can be distributed to the residual link elements, so that it is possible to reduce the load on a server that processes some link elements and equalize the load on the servers as a whole.

[(b) Execution Procedure]

Figure 2:
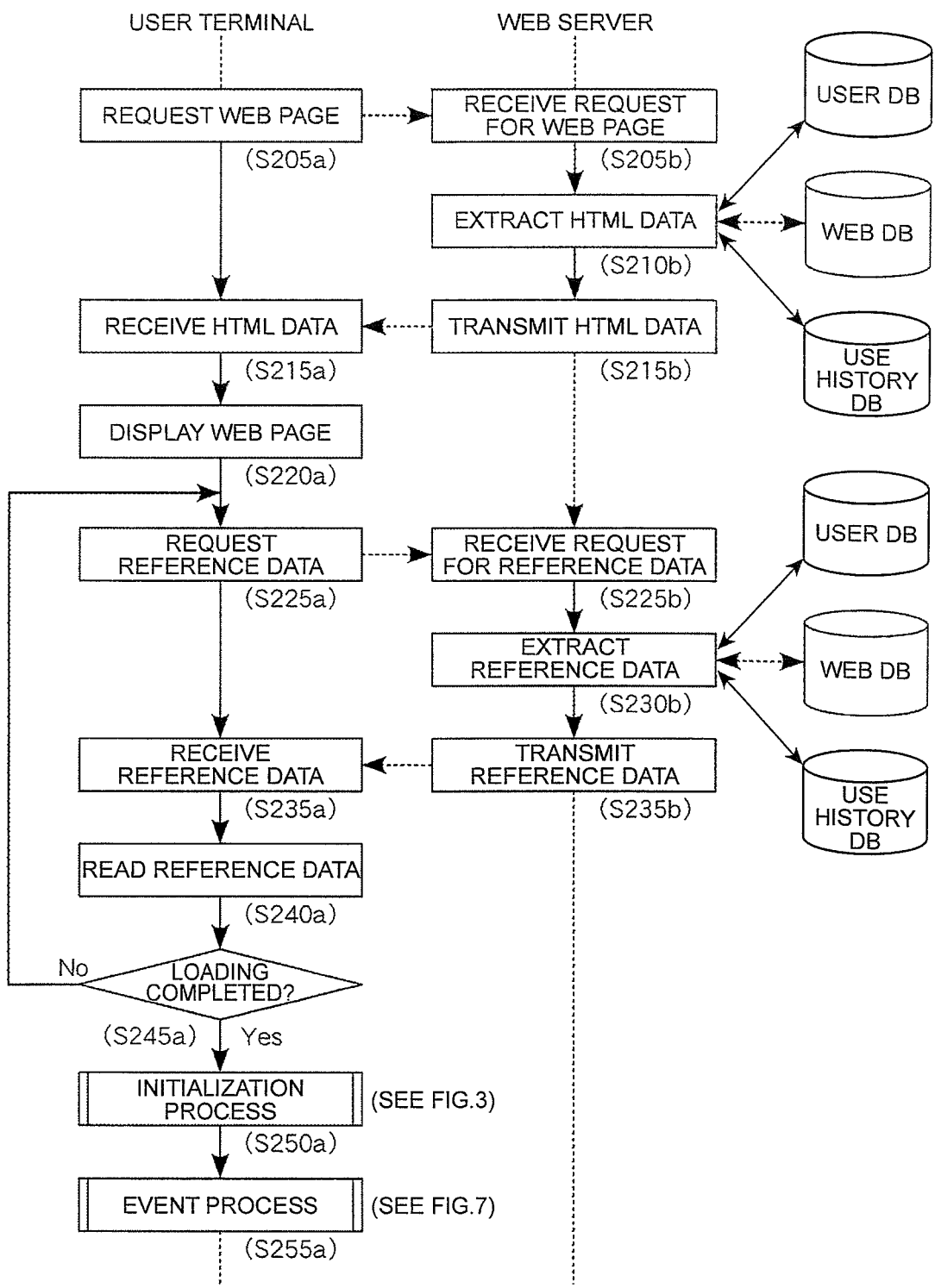
FIG. 2 is a flowchart showing an execution procedure of an object control program (embodiment).

FIG. 2 shows the execution procedure of the object control program in the system for the object control method according to the embodiment.

<11> The user terminal 20 makes a request for a Web page by designating a URL to the Web server 10 (S205a). The Web server 10 receives the request for the Web page from the user terminal 20 (S205b), extracts HTML data corresponding to the designated URL from the Web DB 11 (S210b) and refers to the user DB 12 and the use history DB 13 according to need, and then transmits the data to the user terminal 20 (S215b). The user terminal 20 receives the HTML data from the Web server 10 (S215a) and displays the Web page on the display (S220a).

<12> The user terminal 20 makes a request for reference data in the HTML data by designating a URL to the Web server 10 (S225a). The Web server 10 receives the request for the reference data from the user terminal 20 (S225b), extracts reference data corresponding to the designated URL from the Web DB 11 (S230b) and refers to the user DB 12 and the use history DB 13 according to need, and then transmits the data to the user terminal 20 (S235b). The user terminal 20 receives the reference data from the Web server 10 (S235a), reads the reference data (S240a), and reflects the data on the currently displayed Web page according to need.

<13> The user terminal 20 determines whether loading of the Web page (including the reference data) has completed or not (S245a). When the loading has not completed (No in S245a), the process returns to the above <12> and the user terminal 20 further acquires other reference data. On the other hand, when the loading has completed (Yes in S245a), the process proceeds to the following <14> and starts execution of the script (object control program).

<14> An initialization process (S250a, FIG. 3) and an event process (S255a, FIG. 7) are executed. Further, an icon displacement process is executed repeatedly every specified time period (for example, 5000 milliseconds).

[3. Initialization Process]

[(a) Procedure of Initialization Process]

Figure 3:
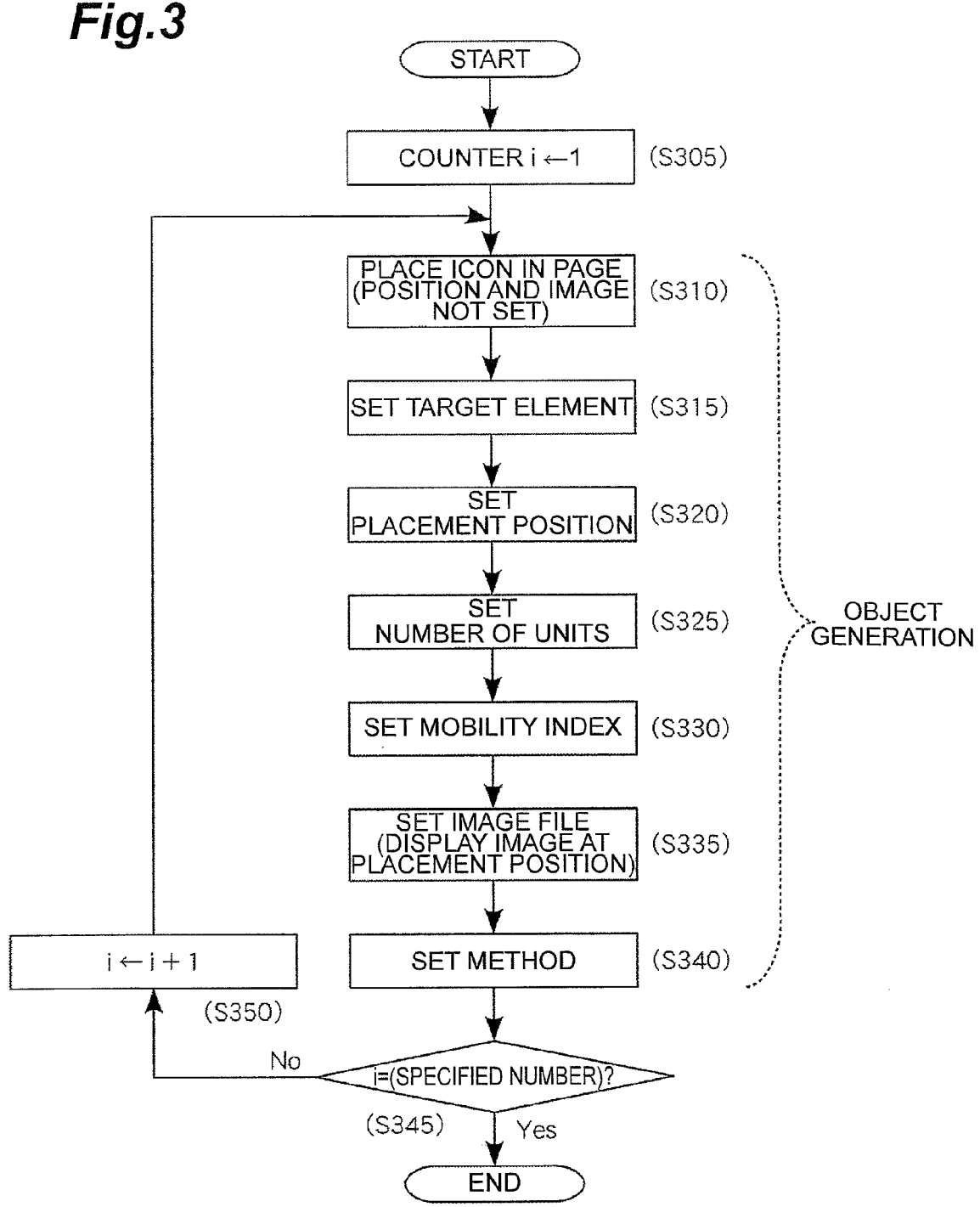
FIG. 3 is a flowchart showing a procedure of an initialization process (embodiment).

FIG. 3 shows a procedure of an initialization process. Hereinafter, a procedure to generate a specified number (100 in this embodiment) of icons (objects), place the icons within a Web page, and set various properties (attributes) and methods (processes) is described by way of illustration. Note that the property items are described later with reference to FIG. 4. As shown in FIG. 3, the user terminal 20 executes the initialization process by the following steps <21> to <26>.

<21> Substitute an initial value 1 into a counter i indicating the icon number (S305).

<22> Place an icon (image element) in a Web page (S310). "id" with the counter number "i" is added to the icon. Note that the icon is not displayed in the Web page because a placement position and an image file are not set at this point of time.

<23> Set "target element", "placement position", "number of units" and "mobility index" for the icon (S315 to S330).

<24> Set an image file for the icon (S335). The image file may be selected randomly from a plurality of files. Each image may be any size, and images of different sizes may coexist. At this point of time, the icon (image) is displayed in the Web page.

<25> Set a method for implementing each process of [4. Event Process] (which is described later) to the icon (S340).

<26> Determine whether the counter i is equal to a specified number (100 in this embodiment) (S345). When the counter i is equal to the specified number (Yes in S345), end the initialization process. On the other hand, when the counter i is not equal to the specified number (No in S345), add 1 to the counter i (S350) and return to the above <22>.

[(b) Setting of Target Element]

In the above <23>, the user terminal 20 sets "target element" of the icon (S315). Specifically, specified id are added to a plurality of elements (link elements) in the Web page, any one is randomly selected from the plurality of id, and an element with the selected id is set as "target element". For example, it is preferred to add the specified id to the following elements. The icon is thereby displayed in front of the element, thereby attracting user's attention.

Specific banner advertisement

Specific link text

Image with a link to a specific campaign page

To specify the target element, at least one element is set among a plurality of elements by the current or past various access data and statistical data (for example, the page views (PV), the click-through rate (CTR), the order quantity and the like) by reference to the use history DB 13. Further, at least one element may be set among a plurality of elements by recognizing elements desired to be accessed and elements not desired to be accessed according to the current server load by reference to the Web server 10. For setting of the element, the current access data, the past data during a certain time period which was a certain period ago, or the current server load may be used. In any case, a threshold may be set so that the element can be set on the basis of the threshold.

Further, it is preferred to specify the target element by obtaining the differentiated value of the current access data, the past data during a certain time period which was a certain period ago, or the current server load by time, determining a Web page in which access concentration is likely to occur or a Web page for which the server load is on the increase.

[(c) Setting of Placement Position]

In the above <23>, the user terminal 20 sets "placement position" of the icon (S320). Specifically, a random position within the content region of the selected target element or in the vicinity of a point on the edge of the region is set as "placement position". In this embodiment, a random position in the vicinity of the top left corner of the selected "target element" is set as "placement position". Note that, if "placement position" is set at random positions within the content region of the selected "target element" and in its vicinity, the "target element" can be covered with a plurality of icons (images), so that clicking on the "target element" can be inhibited.

[(d) Setting of Number of Units]

In the above step <23>, the user terminal 20 sets "number of units" of the icon (S325). The "number of units" is the number of clicks required to completely remove the icon. For example, a random natural number within a given range (for example, 1 to 3) is generated and set as "number of units". Note that "number of units" for all icons may be set to a certain natural number (for example, 1, 2, or the like).

[(e) Setting of Mobility Index]

In the above step <23>, the user terminal 20 sets "mobility index" of the icon (S330). The "mobility index" is a value indicating the probability that the icon is displaced in response to user operation. For example, a random natural number within a given range (for example, 51 to 100) is generated and set as "mobility index". Note that "mobility index" for all icons may be set to a certain natural number (for example, 50 or the like). Further, a natural number corresponding to the icon number (id) may be set to each icon.

[(f) Property Item]

Figure 4:
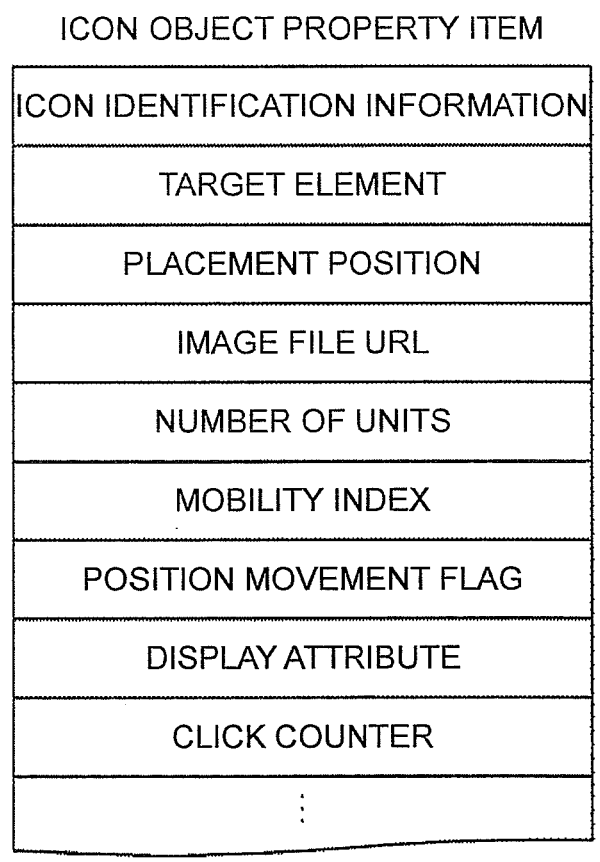
FIG. 4 is an explanation diagram of icon object property items (embodiment).

FIG. 4 shows major property items of icon objects. As shown in FIG. 4, the icon object property contains "identification information", "target element", "placement position", "image file URL", "number of units", "mobility index", "position movement flag", "display attribute", and "click counter". The "position movement flag" is a flag indicating whether the icon is placed at the position after displacement, and when it is significant, the icon is placed at the position after displacement.

[(g) Icon Display Example]

Figure 5:
FIG. 5 is a display example of icons (upper part of a Web page) (embodiment).
Figure 6:
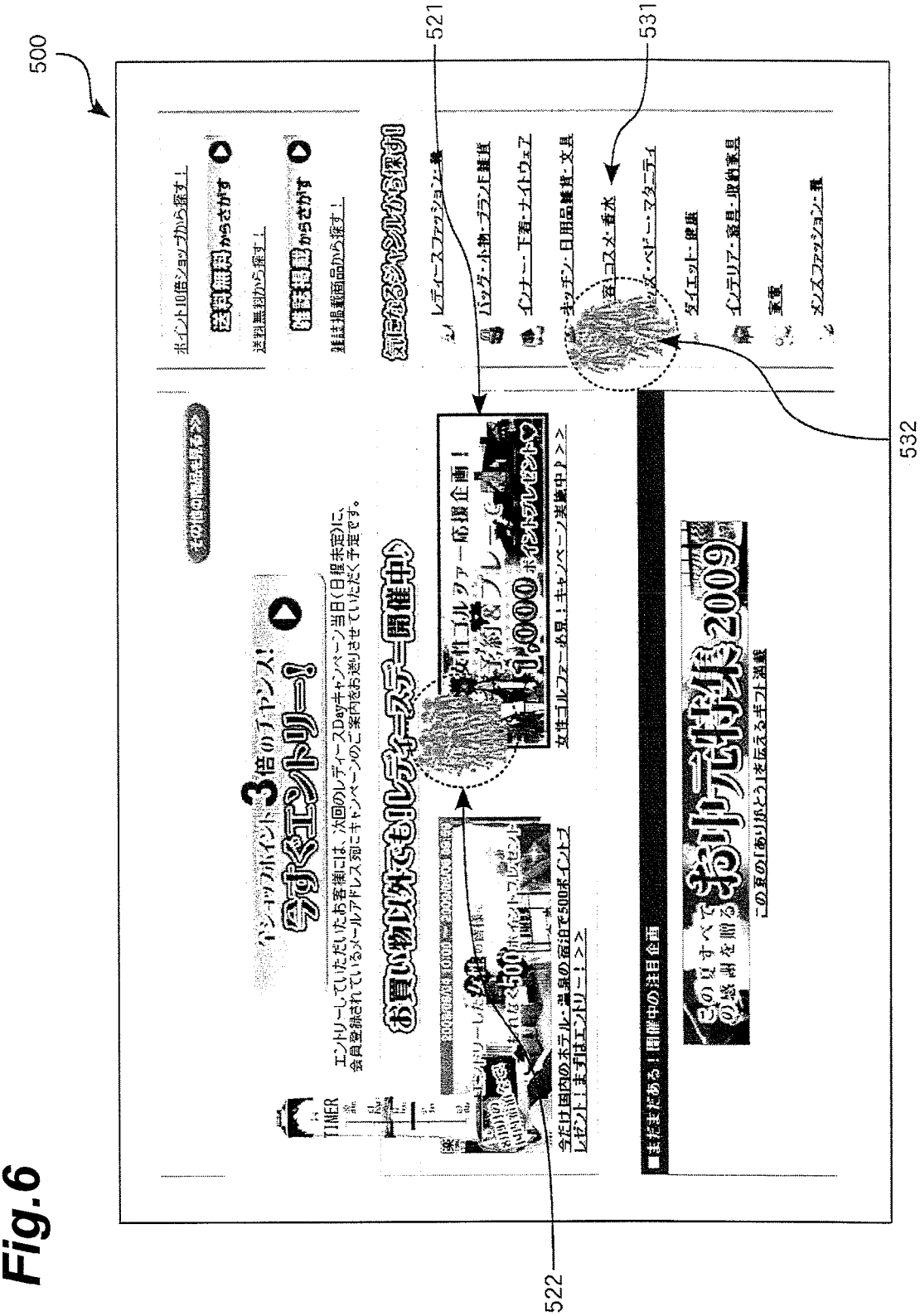
FIG. 6 is a display example of icons (lower part of a Web page) (embodiment).

FIGS. 5 and 6 show display examples of icons. FIGS. 5 and 6 show examples in which an image representing a person (an image having a certain region; a part other than the part corresponding to the body of the person is transparent) is used as an icon, and the icon is displayed superimposed on the front of a specific link element (target element).

In the display example of FIG. 5, a plurality of icons (512) are displayed superimposed on the front of a target element (511), at the placement position set in the vicinity of the top left corner of the target element in the upper part of a Web page (500). In the display example of FIG. 6, a plurality of icons (522 or 532) are displayed superimposed on the front of a target element (521 or 531), at the placement position set in the vicinity of the top left corner of the target element in the lower part of a Web page (500).

As is obvious from those display examples, from the state where a plurality of icons are displayed superimposed on the front of a specific link element (target element) in a Web page, the situation where a large number of consumers gather at a specific product or shop is brought into mind. As a result, it is possible to attract user's attention to the link element. Further, the large number of icons are displayed superimposed on the front of a link element (target element) to interfere with clicking on the link element. As a result, the effect of swaying the buying inclination of users for a bargain product (for example, a product with a limited quantity or within a limited time) introduced in a Web page linked from the link element can be expected.

[4. Event Process]

Figure 7:
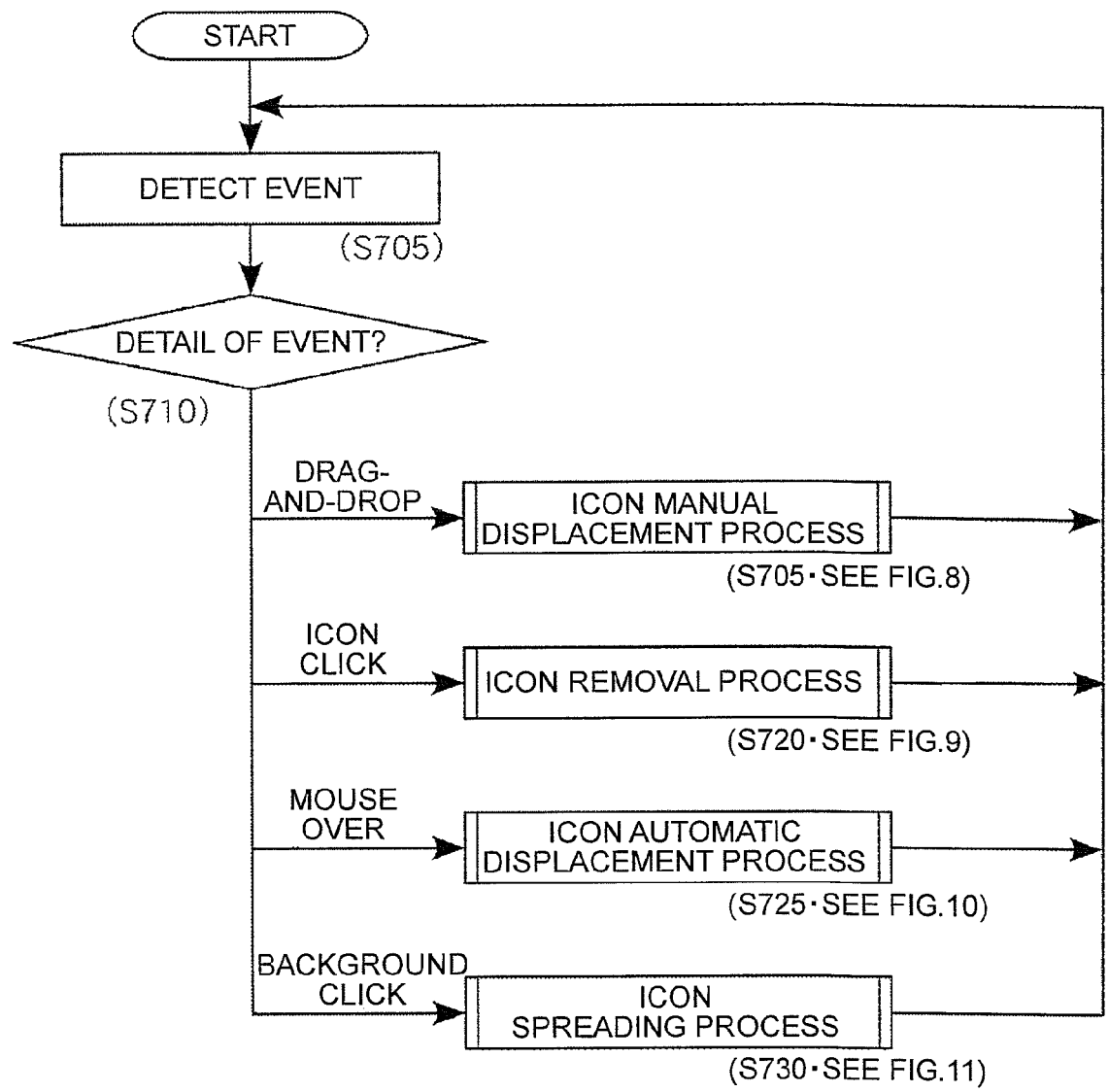
FIG. 7 is a flowchart showing a procedure of an event process (embodiment).

[4-1. Procedure of Event Process] FIG. 7 shows a procedure of an event process. As shown in FIG. 7, each time the user terminal 20 detects an event in a Web page (S705), the user terminal 20 determines the type of the event (S710), and controls icons according to the determined type of the event (any of S715 to S730). Note that, in the following description, the i-th icon object (icon with id containing i) is represented as the icon [i].

[4-2. Icon Manual Displacement Process]

Figure 8:
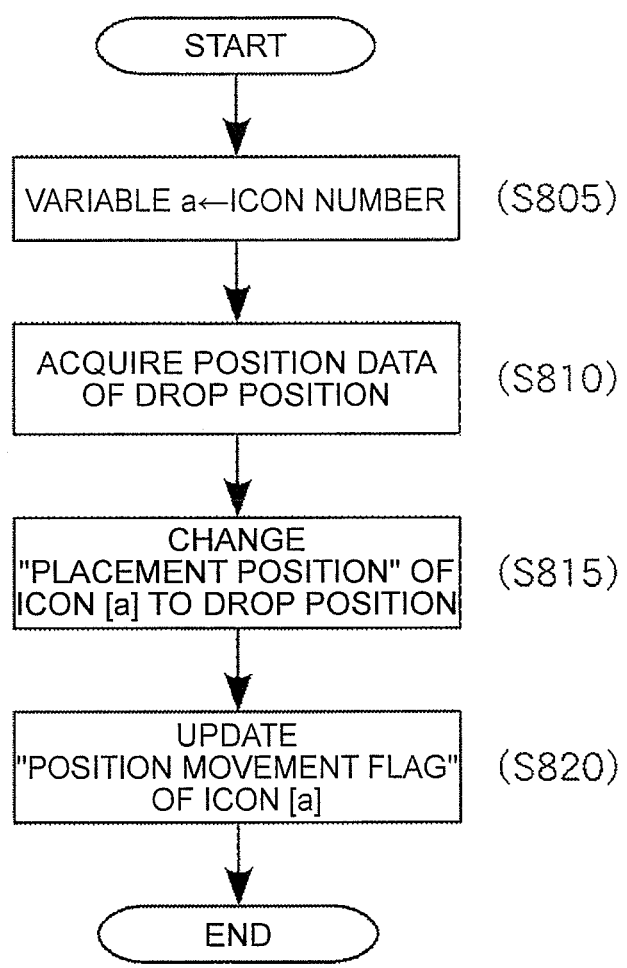
FIG. 8 is a flowchart showing a procedure of an icon manual displacement process (embodiment).

FIG. 8 shows a procedure of an icon manual displacement process. The icon manual displacement process is a process that is performed when drag-and-drop of a specific icon is detected in a Web page ("drag-and-drop" in S710 of FIG. 7) to change "placement position" of the icon to a drop position. As shown in FIG. 8, the user terminal 20 executes the icon manual displacement process by the following steps <31> to <34>.

<31> Substitute a dragged-and-dropped icon number into a variable a indicating the icon number (S805).

<32> Acquire position data of the drop position of the icon [a] (S810).

<33> Change "placement position" of the icon [a] to the drop position (S815).

<34> Update "position movement flag" of the icon [a] (to become significant) (S820).

[4-3. Icon Removal Process]

[(a) Procedure of Icon Removal Process]

Figure 9:
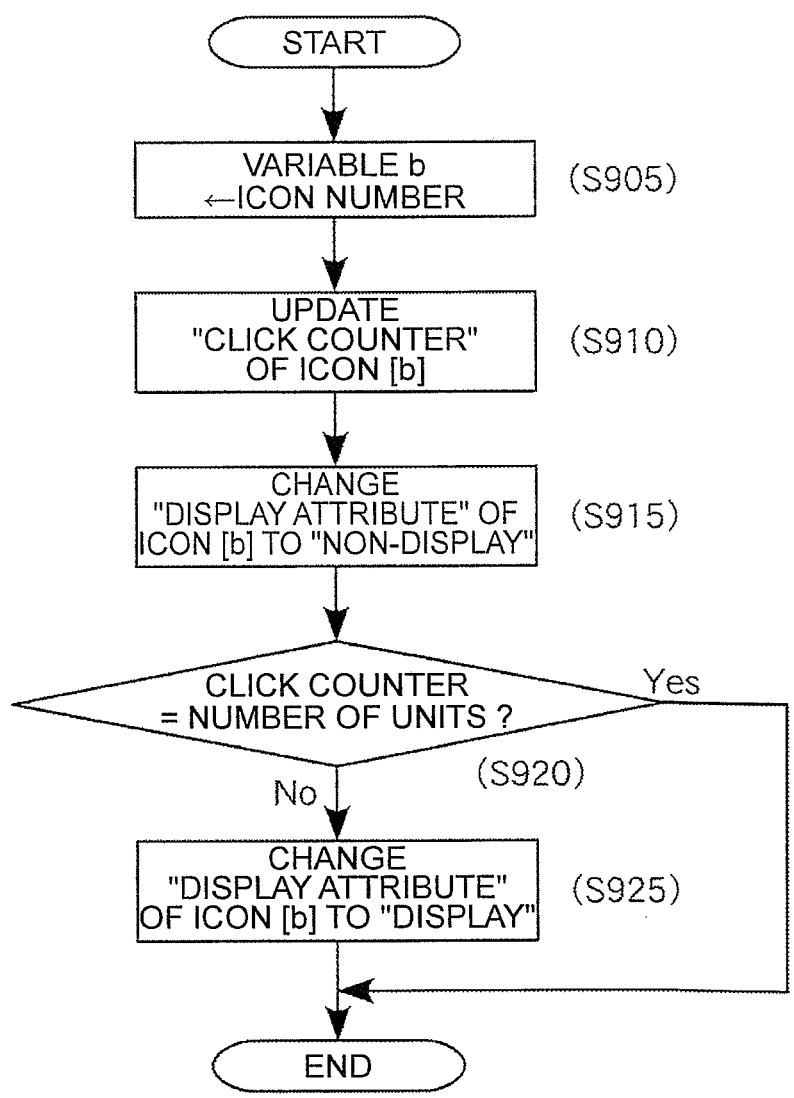
FIG. 9 is a flowchart showing a procedure of an icon removal process (embodiment).

FIG. 9 shows a procedure of an icon removal process. The icon removal process is a process that is performed when click on a specific icon is detected in a Web page ("icon click" in S710 of FIG. 7) to temporarily or completely remove the icon according to the number of clicks. As shown in FIG. 9, the user terminal 20 executes the icon removal process by the following steps <41> to <45>.

<41> Substitute a clicked icon number into a variable b indicating the icon number (S905).

<42> Update (increment) "click counter" of the icon [b] (S910).

<43> Change "display attribute" of the icon [b] to "non-display" (S915). For example, the value of "display" attribute of the icon (<img> tag) may be changed to "none".

<44> Determine whether a value indicated by "click counter" of the icon [b] is equal to "number of units" of the icon [b] or not (S920). When "click counter" is equal to "number of units" (Yes in S920), end the icon removal process. On the other hand, when "click counter" is not equal to "number of units" (No in S920), proceed to the following <45> after the lapse of a specified period of time (for example, after 5000 milliseconds).

<45> Change "display attribute" of the icon [b] to "display" (S925). For example, the value of "display" attribute of the icon (<img> tag) may be changed to "block".

[(b) Alternative Example]

The above-described process removes the icon by one click (S915) and display the removed icon again until "click counter" reaches "number of units" (S925). As another example, the process may be configured to count the number of clicks and remove the icon when the number of clicks reaches a specified value. In this case, no particular processing is performed until the number of clicks reaches a specified value. Further, "click" in the above example may be replaced with "double click".

[4-4. Icon Automatic Displacement Process]

Figure 10:
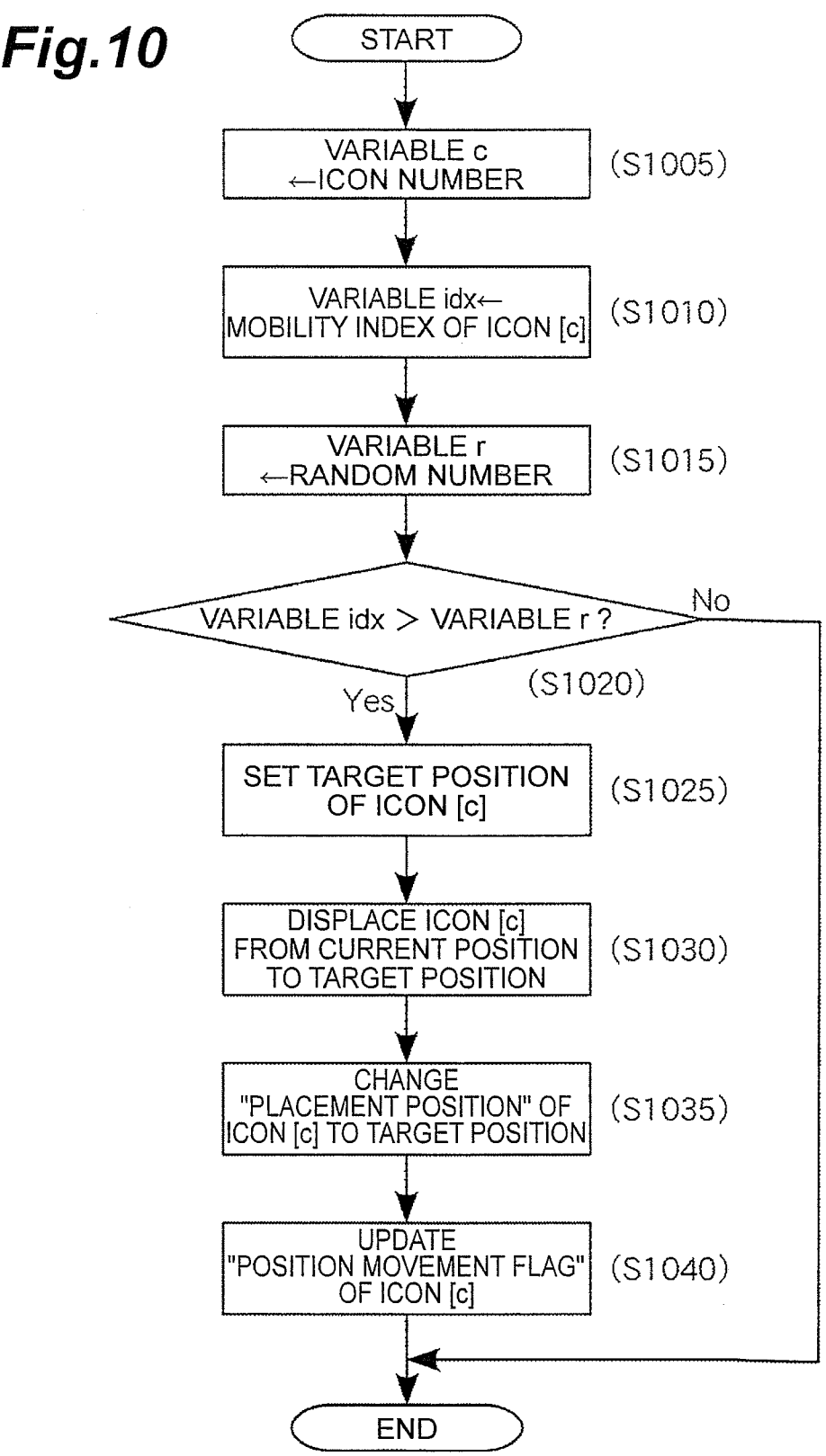
FIG. 10 is a flowchart showing a procedure of an icon automatic displacement process (embodiment).

[(a) Procedure of Icon Automatic Displacement Process] FIG. 10 shows a procedure of an icon automatic displacement process. The icon automatic displacement process is a process that is performed when it is detected that a mouse pointer is placed over the content region of a specific icon in a Web page ("mouse over" in S710 of FIG. 7) to displace the icon in accordance with a specified probability. As shown in FIG. 10, the user terminal 20 executes the icon automatic displacement process by the following steps <51> to <55>.

<51> Substitute an icon number on which a pointer is placed into a variable c indicating the icon number (S1005).

<52> Substitute "mobility index" of the icon [c] into a variable idx (S1010). Note that a natural number of 50 to 100 is set to "mobility index".

<53> Generate a random number within a specified range and substitute it into a variable r (S1015). In this example, a random number is generated within a range of 0 to less than 100.

<54> Determine whether the variable idx is greater than the variable r or not (whether "mobility index" of the icon [c] is greater than the random number) (S1020). When the variable idx is greater than the variable r (Yes in S1020), proceed to the following <55>. On the other hand, when the variable idx is not greater than the variable r (No in S1020), end the icon automatic displacement process.

<55> Set a target position of the icon [c] (S1025), displace the icon [c] from the current position to the target position (S1030), change "placement position" of the icon [c] to the target position (S1035), and update "position movement flag" of the icon [c] (to become significant) (S1040).

[(b) Setting of Target Position]

In the above <55>, the user terminal 20 sets a target position of the icon [c] (S1025). For example, the direction of displacement is randomly selected from a plurality of candidates for the direction (for example, four directions of upward, downward, leftward and rightward, eight directions including oblique directions and the like), and a random distance of displacement is set within a specified range (for example, 50 to 100 pixels etc.). Then, a position in the selected direction of displacement and with the set distance of displacement is calculated on the basis of the current position and set as the target position.

[(c) Icon Displacement, etc.]

In the above step <55>, the user terminal 20 displaces the icon [c] from the current position to the target position (S1030), and changes "placement position" of the icon [c] to the target position (S1035). For example, it is preferred to perform the displacement in the following aspects (see the above <Definition>). Note that in the following (a) and (c), the icon can be displaced by changing "placement position" of the icon. In this case, the process to displace the icon (S1030) and the process to change "placement position" of the icon (S1035) practically merge.

(a) Assume a plurality of points on a line (line segment, curved line) connecting the first point and the second point and repeat display and removal of the element at each point sequentially at high speed.

(b) Slide the element currently displayed at the first point to the second point.

(c) Remove the element currently displayed at the first point and display the element at the second point.

[4-5. Icon Spreading Process]

Figure 11:
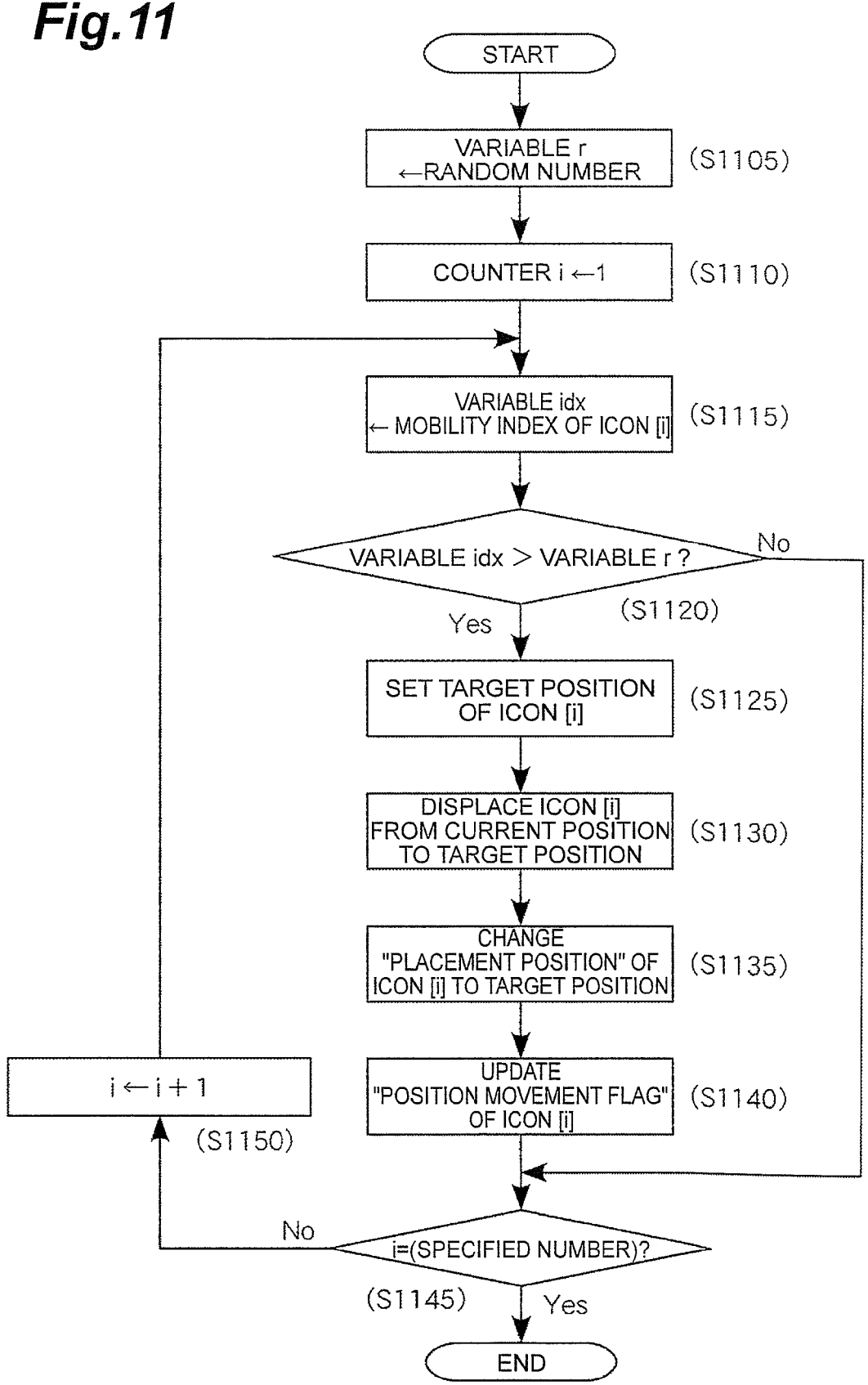
FIG. 11 is a flowchart showing a procedure of an icon spreading process (embodiment).

[(a) Procedure of Icon Spreading Process] FIG. 11 shows a procedure of an icon spreading process. The icon spreading process is a process that is performed when click on a background region is detected in a Web page ("background click" in S710 of FIG. 7) to displace each icon in accordance with a specified probability. Note that the same process may be performed when double-click on a background region is detected in a Web page. As shown in FIG. 11, the user terminal 20 executes the icon spreading process by the following steps <61> to <66>.

<61> Generate a random number within a specified range and substitute it into a variable r (S1105). In this example, a random number is generated within a range of 0 to less than 100.

<63> Substitute an initial value 1 into a counter i indicating the icon number (S1110).

<64> Substitute "mobility index" of the icon [i] into a variable idx (S1115). Note that a natural number of 50 to 100 is set to "mobility index".

<64> Determine whether the variable idx is greater than the variable r or not (whether "mobility index" of the icon [i] is greater than the random number) (S1120). When the variable idx is greater than the variable r (Yes in S1120), proceed to the following <65>. On the other hand, when the variable idx is not greater than the variable r (No in S1120), proceed to the following <66>.

<65> Set a target position of the icon [i] (S1125), displace the icon [i] from the current position to the target position (S1130), change "placement position" of the icon [i] to the target position (S1135), and update "position movement flag" of the icon [i] (to become significant) (S1140).

<66> Determine whether the counter i is equal to a specified number (the number of icons to be displayed in a Web page; 100 in this embodiment) (S1145). When the counter i is equal to the specified number (Yes in S1145), end the icon spreading process. On the other hand, when the counter i is not equal to the specified number (No in S1145), add 1 to the counter i (S1150) and return to the above <63>.

[(b) Icon Displacement, etc.]

In the above step <65>, the user terminal 20 sets a target position of the icon [i] (S1125), displaces the icon [i] from the current position to the target position (S1130), and changes "placement position" of the icon [i] to the target position (S1135). Note that the setting of the target position, icon displacement aspects and the like are the same as in the case of the above [4-4. Icon Automatic Displacement Process] (see [(b) Setting of Target Position] and [(c) Icon Displacement, etc.] of [4-4. Icon Automatic Displacement Process]).

[5. Icon Re-Displacement Process]

[(a) Procedure of Icon Re-Displacement Process]

Figure 12:
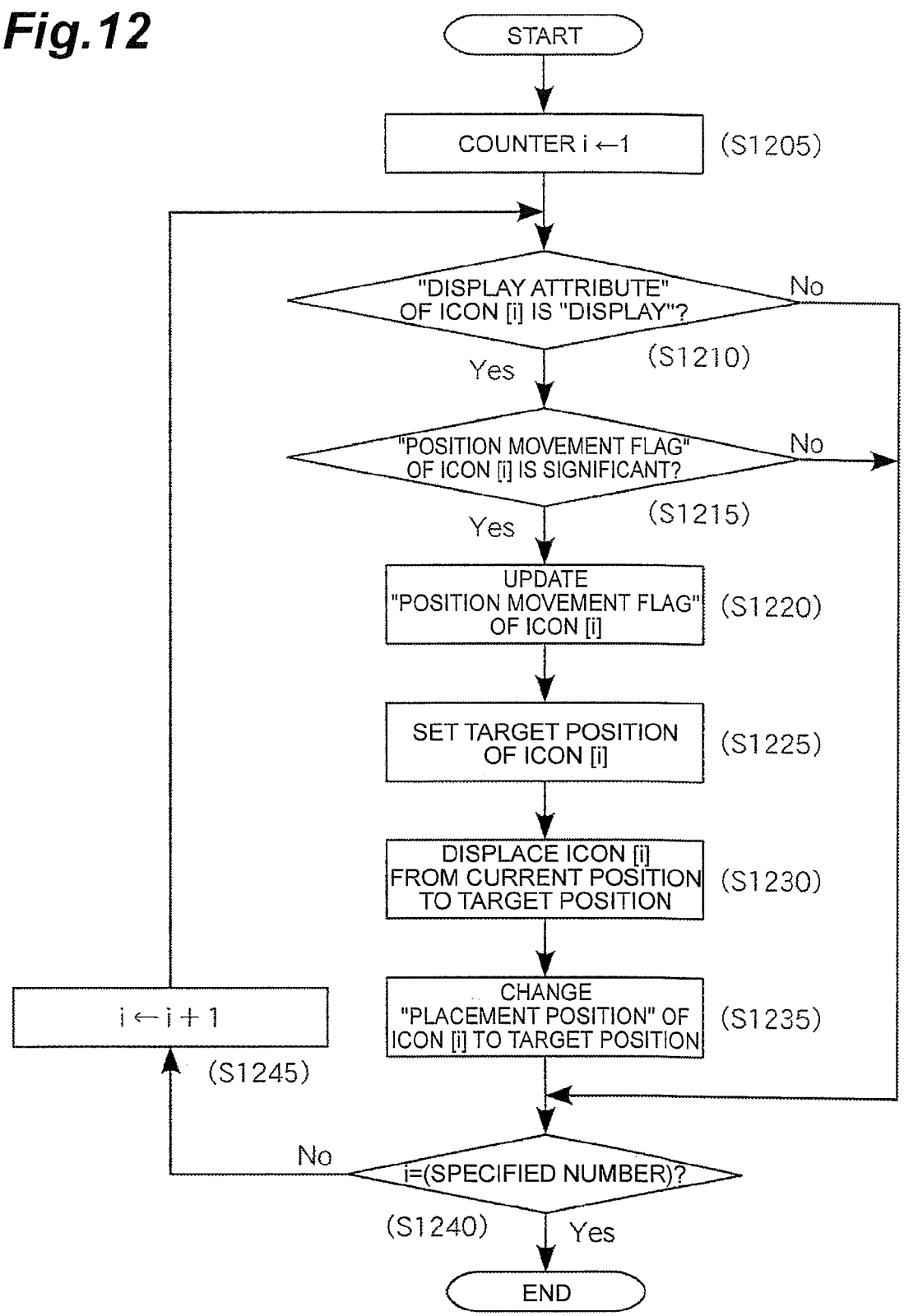
FIG. 12 is a flowchart showing a procedure of an icon re-displacement process (embodiment).

FIG. 12 shows a procedure of an icon re-displacement process. The icon re-displacement process is a process to displace the icon whose placement position has changed in a Web page (the icon that is not placed in front of a link element) again in the direction of the selected target. As shown in FIG. 12, the user terminal 20 executes the icon re-displacement process by the following steps <71> to <76>. It is preferred that the icon re-displacement process is executed repeatedly every specified time period (for example, 5000 milliseconds).

<71> Substitute an initial value 1 into a counter i indicating the icon number (S1205).

<72> Determine whether "display attribute" of the icon [i] is "display" or not (S1210). When "display attribute" is "display" (Yes in S1210), proceed to the following <73>. On the other hand, when "display attribute" is not "display" (No in S1210), proceed to <76> below.

<73> Determine whether "position movement flag" of the icon [i] is significant or not (S1215). When "position movement flag" is significant (Yes in S1215), proceed to the following <74>. On the other hand, when "position movement flag" is not significant (No in S1215), proceed to <76> below.

<74> Update "position movement flag" of the icon [a] (to become insignificant) (S1220).

<75> Set a target position of the icon [i] (S1225), displace the icon [i] from the current position to the target position (S1230), and change "placement position" of the icon [i] to the target position (S1235).

<76> Determine whether the counter i is equal to a specified number (the number of icons to be displayed in a Web page; 100 in this embodiment) (S1240). When the counter i is equal to the specified number (Yes in S1240), end the icon re-displacement process. On the other hand, when the counter i is not equal to the specified number (No in S1240), add 1 to the counter i (S1245) and return to the above <72>.

[(b) Setting of Target Position]

In the above <75>, the user terminal 20 sets "placement position" of the icon [i] (S1225). Specifically, a random position within the content region of "target element" or in the vicinity of a point on the edge of the region is set as the target element. Note that the position before displacement (the position before displacement in S815 of FIG. 8, S1030 of FIG. 10, or S1130 of FIG. 11) may be stored, and the position before displacement may be set as the target position.

[(c) Icon Displacement, etc.]

In the above step <75>, the user terminal 20 displaces the icon [i] from the current position to the target position (S1230) and changes "placement position" of the icon [i] to the target position (S1235). Note that the icon displacement aspects or the like are the same as in the case of the above [4-4. Icon Automatic Displacement Process] (see [(c) Icon Displacement, etc.] of [4-4. Icon Automatic Displacement Process]).

Reference Signs List

10 . . . Web server, 11 . . . Web DB, 20 . . . User terminal, 30 . . . Internet, 500 . . . Web page

The invention claimed is:

1. An object control method for a Web page containing a plurality of link elements with a link provided to another Web page to display a plurality of icons in association with a link element among the plurality of link elements, the method causing a computer terminal for displaying the Web page containing the plurality of link elements to execute:
    a link element setting step of setting at least one link element among the plurality of link elements based on a current or past access data, which indicates a use history of the Web page related to the at least one link element or based on a current server load;
    a placement position setting step of setting, for each of the plurality of icons, a placement position of the icon within a content region of the set link element;
    an icon display step of displaying the plurality of icons in front of the link element at the set placement position to interfere with clicking on the link element; and
    an icon displacement step of displacing one or more of the plurality of icons when user operation on one of the plurality of icons is detected.

2. The object control method according to claim 1, wherein the link element setting step of setting at least one link element among the plurality of link elements by using a current server load.

3. The object control method according to claim 2, wherein the link element setting step of obtaining the differentiated value of the current server load and setting at least one link element among the plurality of link elements.

4. The object control method according to claim 2, further causing the computer terminal to execute:
    an icon re-displacement step of displacing each of the displaced icons to a placement position before change or its vicinity.

5. The object control method according to claim 2, further causing the computer terminal to execute:
    an icon removal step of, when click or double-click on any of the icons is detected, removing the icon.

6. The object control method according to claim 5, wherein the icon removal step includes a process of counting number of clicks on each of the icons and displaying the removed icon again after a lapse of a specified period of time when the counted number of clicks does not reach a specified number.

7. The object control method according to claim 5, wherein the icon removal step is a step of counting number of clicks on each of the icons and removing the icon when the counted number of clicks reaches a specified number.

8. The object control method according to claim 1, wherein the link element setting step of obtaining the differentiated value of the current access data and setting at least one link element among the plurality of link elements.

9. The object control method according to claim 1, wherein each of the icons is an image having a certain region, and the plurality of icons are displayed superimposed on a whole area in front of the link element to interfere with clicking on the link element by the plurality of icons.

10. The object control method according to claim 1, further causing the computer terminal to execute:
    an icon re-displacement step of displacing each of the displaced icons to a placement position before change or its vicinity.

11. The object control method according to claim 1, further causing the computer terminal to execute:
    an icon removal step of, when click or double-click on any of the icons is detected, removing the icon.

12. The object control method according to claim 11, wherein
the icon removal step includes a process of counting number of clicks on each of the icons and displaying the removed icon again after a lapse of a specified period of time when the counted number of clicks does not reach a specified number.

13. The object control method according to claim 11, wherein
the icon removal step is a step of counting number of clicks on each of the icons and removing the icon when the counted number of clicks reaches a specified number.

14. The object control method according to claim 1, wherein the plurality of icons are placed within the content of the link element to create a populated atmosphere indicating crowd gathering at a product or a shop represented on the Web page.

15. A non-transitory computer-readable storage medium storing an object control program for a Web page containing a plurality of link elements with a link provided to another Web page to display a plurality of icons in association with a link element among the plurality of link elements, the program causing a computer terminal for displaying the Web page containing the plurality of link element to execute:
a link element setting step of setting at least one link element among the plurality of link elements based on a current or past access data, which indicates a use history of the Web page related to the at least one link element or based on a current server load;
a placement position setting step of setting, for each of the plurality of icons, a placement position of the icon within a content region of the set link element;
an icon display step of displaying the plurality of icons in front of the link element at the set placement position to interfere with clicking on the link element; and
an icon displacement step of displacing one or more of the plurality of icons when user operation on one of the plurality of icons is detected.

16. A Web server connectable with a user terminal, comprising:
a Web data storage unit that stores Web data at least including data of a Web page containing a link element with a link provided to another Web page and the object control program embedded in the Web page; and
a Web data transmitting unit that transmits the Web data to the user terminal in response to a request from the user terminal,
wherein the object control program for a Web page containing a plurality of link elements with a link provided to another Web page to display a plurality of icons in association with the link element, the program causing a computer terminal for displaying the Web page containing the plurality of link element to execute:
a link element setting step of setting at least one link element among the plurality of link elements based on a current or past access data, which indicates a use history of the Web page related to the at least one link element or based on a current server load;
a placement position setting step of setting, for each of the plurality of icons, a placement position of the icon within a content region of the set link element;
an icon display step of displaying the plurality of icons in front of the link element at the set placement position to interfere with clicking on the link element; and
an icon displacement step of displacing one or more of the plurality a plurality of icons when user operation on one of the plurality of icons is detected.

* * * * *